COMPRESSION IGNITION ENGINE

Original Filed April 24, 1963 5 Sheets-Sheet 1

INVENTOR.
MAX G. FIELDER
BY Diggins, O'Boyle & Harmon
ATTORNEYS.

COMPRESSION IGNITION ENGINE

Original Filed April 24, 1963 5 Sheets-Sheet 2

INVENTOR.
MAX G. FIELDER

BY Diggins, O'Boyle & Harman
ATTORNEYS.

June 20, 1967

M. G. FIELDER

Re. 26,222

COMPRESSION IGNITION ENGINE

Original Filed April 24, 1963

5 Sheets-Sheet 3

INVENTOR.
MAX G. FIELDER

BY Diggins, O'Boyle + Harman

ATTORNEYS.

COMPRESSION IGNITION ENGINE

Original Filed April 24, 1963

5 Sheets-Sheet 4

INVENTOR.
MAX G. FIELDER

BY Diggins, O'Boyle & Harman

ATTORNEYS.

COMPRESSION IGNITION ENGINE

Original Filed April 24, 1963 5 Sheets-Sheet 5

INVENTOR.
MAX G. FIELDER
BY
Diggins, O'Boyle & Harman
ATTORNEYS.

United States Patent Office

Re. 26,222

Reissued June 20, 1967

26,222

COMPRESSION IGNITION ENGINE

Max G. Fielder, 282 S. Gulph Road,
King of Prussia, Pa. 19406

Original No. 3,242,913, dated Mar. 29, 1966, Ser. No. 275,424, Apr. 24, 1963. Application for reissue May 4, 1966, Ser. No. 553,000

6 Claims. (Cl. 123—32)

Matter enclosed in heavy brackets [ ] appears in the original patent but forms no part of this reissue specification; matter printed in italics indicates the additions made by reissue.

This invention relates to internal combustion engines, and more particularly to compression ignition engines of the air-fuel burning type.

In my prior Patent No. 2,250,364 dated July 22, 1941, there is disclosed a compression ignition engine constructed and arranged to effect a direct oxidation of the air-fuel mixture rather than a decomposition of the mixture. The most favorable and complete combustion; namely, oxidation, of the fuel mixture takes place by injecting the fuel into the combustion chamber in the form of a coarse spray rather than a mist or vapor, as in diesel engines, and enabling the fuel to *be readily dispersed within the air in the combustion chamber and cylinder* [readily combine with the air in the combustion chamber before the mixture is ignited].

While the engine disclosed in my above-mentioned patent has been satisfactory, after considerable research and experimentation I have developed an improved two-cycle engine comprising, essentially, horizontally opposed cylinders having pistons slidably mounted therein, the engine utilizing a Lanchester arrangement for connecting the pistons to a sectional crank shaft. The engine also includes an improved fuel pump mechanism operatively connected to the crank shaft for feeding a measured amount of fuel through an improved fuel nozzle and combustion chamber assembly mounted in the cylinder head. The engine is provided with a scavenging arrangement including a plurality of exhaust ports and a plurality of air inlet ports formed in the cylinder wall, the air inlet ports being positioned beneath the exhaust ports, whereby the gases enter and leave the cylinder in opposite directions. The cylinders of the improved engine are provided with aluminum liners having a coating of chromium plating; the piston and cylinder heads are formed from aluminum and the combustion chamber includes a thin-walled sleeve of high temperature, heat resistant steel surrounded by a spaced chromium plated sleeve.

The engine of the present invention is constructed and arranged to have the air injected into the cylinder when the piston is at approximately bottom dead center and a coarse spray of fuel rapidly injected through the combustion chamber and into relatively cold (200° F.) uncompressed air within the cylinder at the beginning of the compression stroke; namely, at a crank angle of approximately 65 degrees after bottom dead center and at a comparatively low pressure (400 to 600 p.s.i.g.) for a duration of approximately 10 degrees of travel of the crank to thereby avoid decomposition of the hydrocarbon. The [fuel droplets suspended in air are] *air containing the fuel droplets is* compressed by the piston, and the temperature of the interiorly insulated steel combustion chamber walls increases at approximately the same rate as the air suspended fuel droplets. The improved engine is also designed to have a compression ratio in the neighborhood of 34 to 1 of the effective stroke volume, so that at the end of the compression stroke substantially the total volume of the [fuel droplets suspended in air are] *air containing the fuel droplets is* rapidly compressed into the combustion chamber, during the adiabatic compression, at a rate greater than the combustion reaction rate, *thus increasing the temperature of the air containing the fuel droplets to a temperature above that at which ignition and combustion can take place before such ignition and combustion can take place*; thus, combustion does not occur until the piston has moved past top dead center and the volume of the [air suspended fuel droplets] *air containing the fuel droplets* starts to increase and the pressure and temperature are lowered into the range where ignition will occur.

An object of the invention is to provide an improved method of operating an internal combustion engine of the compression ignition type having a combustion chamber, wherein air is admitted into the engine cylinder when the piston is at approximately bottom dead center, rapidly injecting a coarse spray of fuel through the combustion chamber into the cylinder when the piston is at a crank angle of approximately 65 degrees after bottom dead center rapidly compressing the [fuel droplets suspended in air] *air and the fuel droplets* into the combustion chamber at a rate, *thus increasing the temperature of the air containing the fuel droplets to a temperature above that at which ignition and combustion can take place before such ignition and combustion can take place,* greater than the combustion reaction rate to preclude combustion until the piston has moved over top dead center and the volume of the fuel-air mixture starts to increase and the pressure and temperature are lowered into the range where oxidation can occur.

Another object of the invention is to provide an improved internal combustion engine of the compression ignition type having cylinders, pistons, and a cylinder head formed from aluminum, cylinder liners formed from aluminum with a coating of chromium plating and a combustion chamber including a thin-walled sleeve of high temperature, heat-resistant steel surrounded by a spaced chromium plated sleeve.

Still another object of the invention is to provide an improved internal combustion engine of the compression ignition type wherein a fuel nozzle is provided for discharging a coarse spray of fuel through the combustion chamber into the cylinder, said nozzle including a valve member spring-biased to closed position against a flat seat, whereby fuel pressure forces the valve member away from the seat to allow fuel to pass [through the combustion chamber into] *into the combustion chamber and* the engine cylinder.

Yet another object of the invention is to provide an improved internal combustion engine of the compression ignition type having a scavenging arrangement including a plurality of annularly disposed exhaust ports and air inlet ports formed in the cylinder wall, said air inlet ports being positioned beneath the exhaust ports, the exhaust ports being constructed and arranged to have the greatest circumferential length and a minimum height, providing the greatest possible area at highest pressure with a minimum of port height resulting in the smallest effective stroke loss for maximum discharge area, and wherein the gases enter and leave the cylinder in opposite directions.

A further object of the invention is to provide an improved internal combustion engine of the compression ignition type having a fuel pump mechanism operatively connected to the engine crank shaft [in such a manner that the fuel is rapidly injected through the combustion chamber and into the engine cylinder] *, and hydraulically connected to a nozzle, in such a manner that the fuel is rapidly injected into the combustion chamber and engine cylinder, in relatively coarse droplet form,* so that no combustion can be initiated during the admission period.

A still further object of the invention is to provide an improved internal combustion engine of the compression ignition type having a sectional crank shaft adapted to carry the solid ends of a plurality of connecting rods, said rods being constructed and arranged so that the mass of one connecting rod equals the sum of the masses of two smaller and oppositely disposed connecting rods.

With these and other objects in view, which may be incident to my improvements, the invention consists in the parts and combinations to be hereinafter set forth and claimed, with the understanding that the several necessary elements comprising my invention, may be varied in construction, proportions and arrangements, without departing from the spirit and scope of the appended claim.

In order to make my invention more clearly understood, I have shown in the accompanying drawings means for carrying the same into practical effect, without limiting the improvements in their useful application to the particular constructions which, for the purpose of explanation, have been made the subject of illustration.

Figure 1:
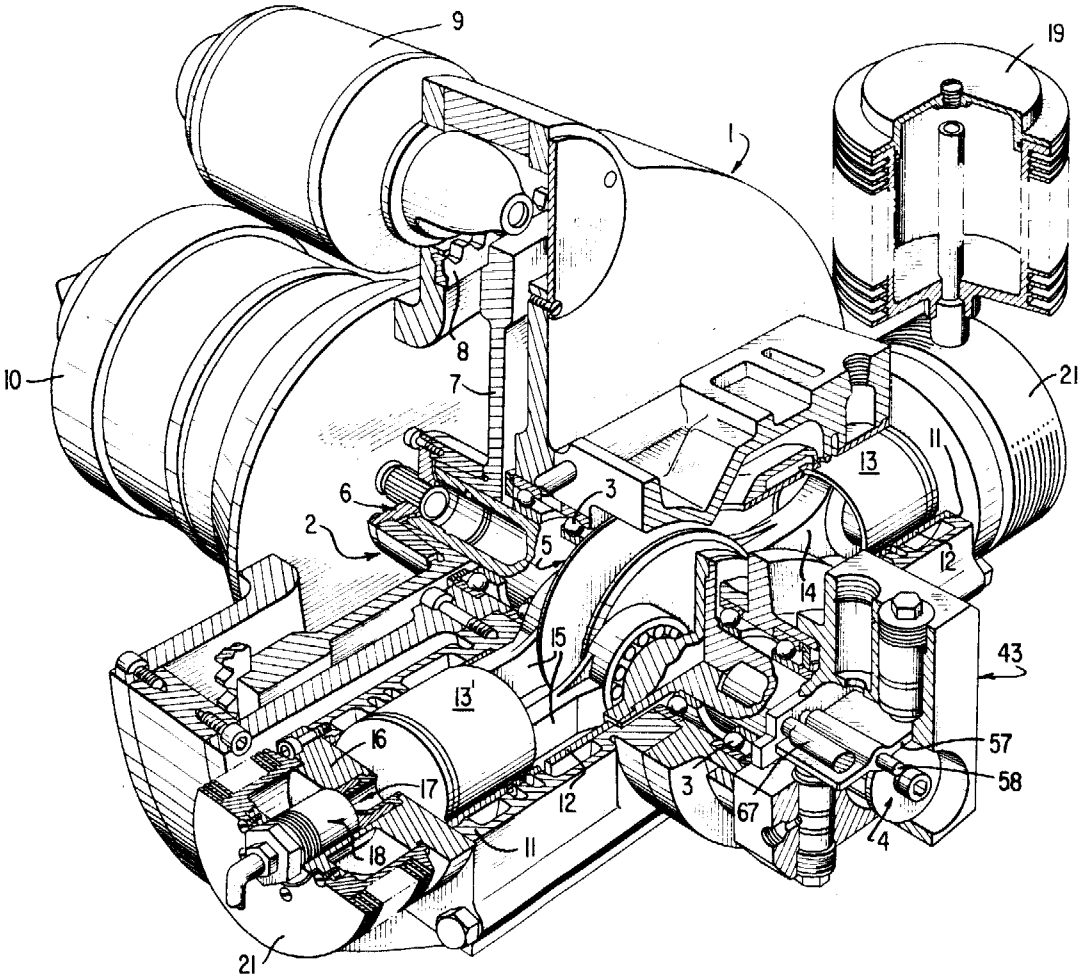
FIGURE 1 is a perspective view, partially in section, of the internal combustion engine of the present invention.
Figure 2:
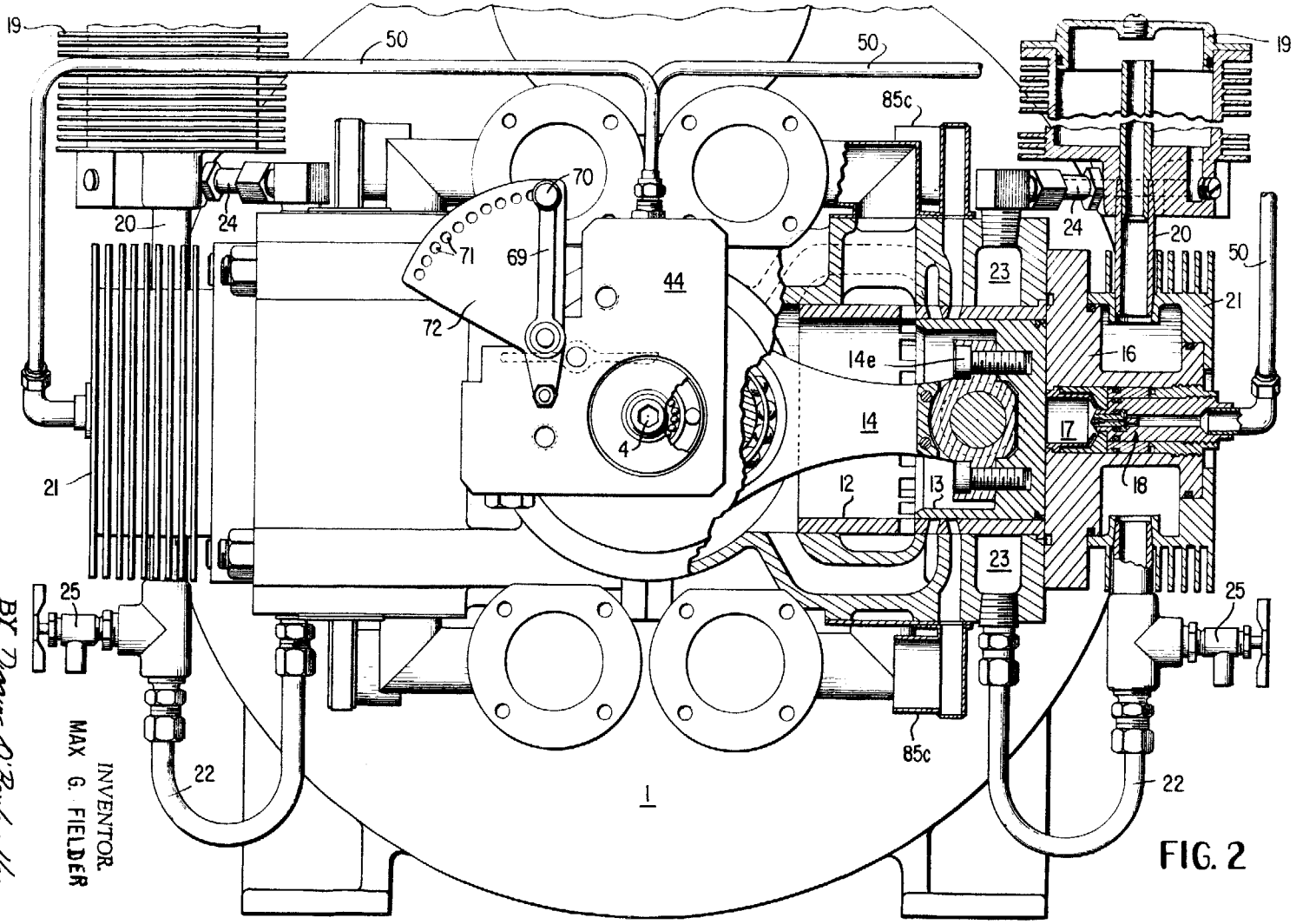
FIG. 2 is an enlarged end elevational view, partially in section, of the engine.

Referring to the drawings, and more particularly to FIGURES 1 and 2, the horizontally-opposed, compression ignition engine of the present invention comprises a housing 1 having a drive shaft 2 rotatably mounted therein by means of a plurality of anti-friction ball bearings 3. The drive shaft includes a fuel pump drive section 4, a crank shaft section 5 and a generator drive section 6. A flywheel 7 is secured to the drive shaft and is provided with a ring gear 8 which is adapted to be engaged by the pinion of a starting motor 9, and a generator 10 is connected to the end section 6 of the drive shaft.

A pair of horizontally opposed cylinders 11 are formed in the housing, each cylinder having an aluminum, chromium plated liner 12 positioned therein and an aluminum piston 13, 13' slidably mounted within the liner. One piston is connected to the crank shaft by means of a connecting rod 14 and the other piston is connected to the crank shaft by a pair of connecting rods 15, the mass of the connecting rod 14 being equal to the sum of the masses of connecting rods 15 to thereby balance the system. Each cylinder is provided with an aluminum cylinder head 16 having a combustion chamber 17 positioned therein, said chamber being in communication with a fuel nozzle assembly 18, to be described more fully hereinafter.

The cooling system for the engine includes a sealed glycol loop comprising a glycol reservoir 19 which is in communication through pipe 20 with a finned heat exchanger 21 surrounding each fuel nozzle assembly 18. A line 22 connects the heat exchanger 21 with an annular chamber 23 surrounding the upper portion of the cylinder and a line 24 is provided for returning the glycol to the reservoir. The glycol is circulated through the system by a pump (not shown) and a petcock 25 is provided for draining the system when necessary.

Figure 3:
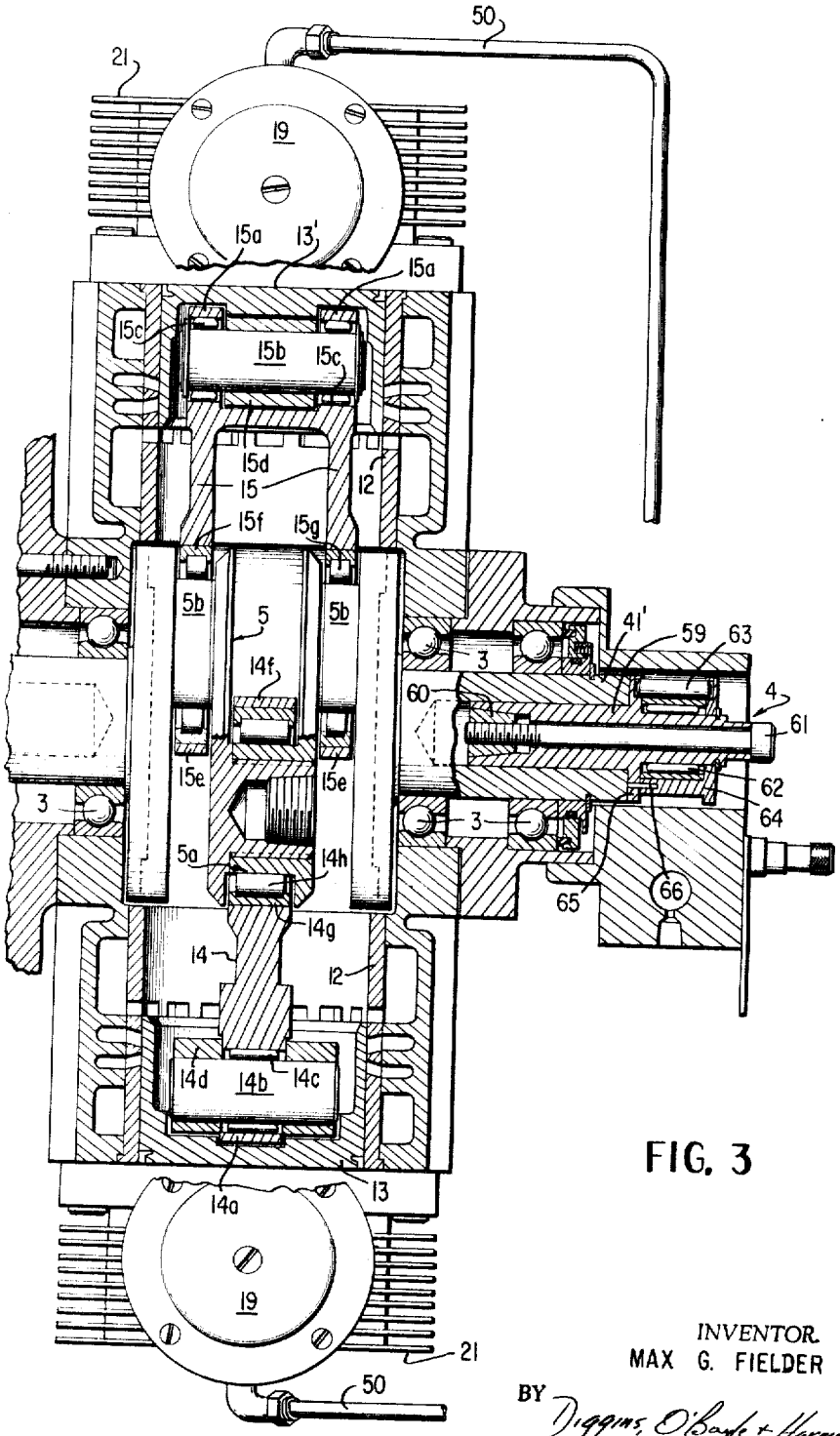
FIG. 3 is an enlarged side elevational view, partially in section, of the engine, showing the details of the crank shaft and the connecting rod assembly.

Since the engine of the present invention is designed to operate at compression pressures in excess of 1000 p.s.i.g. and at rotative speeds in the neighborhood of 8000 r.p.m., to design roller bearings or ball bearings for the crank shaft to carry these high loads at such high rotative speeds would result in a structure of such a size that the rotative masses and bending forces would be too unwieldy and out of proportion; hence, an S-type crank or Lanchester system is utilized. As will be seen in FIG. 3, the connecting rod 14 has an outer end 14a journalled on a wrist pin 14b by means of roller bearings 14c. The wrist pin is carried by a pair of yoke members 14d rigidly secured to the inner surface of the piston by bolts 14e (FIG. 2) or other suitable securing means. The inner or crank end 14f of connecting rod 14 is provided with a cylindrical sleeve 14g which forms an outer race for a plurality of roller bearings 14h mounted between the sleeve and a central crank pin 5a provided on the crank shaft 5.

The outer ends 15a of integral connecting rods 15 are similarly journalled on a wrist pin 15b by means of roller bearings 15c, said wrist pin being carried by a yoke member 15d rigidly secured to the inner surface of the piston 13'. The inner or crank ends 15e of the connecting rods are provided with cylindrical sleeves 15f which form outer races for a plurality of roller bearings 15g mounted between the sleeves and outer crank pins 5b.

Figure 5:
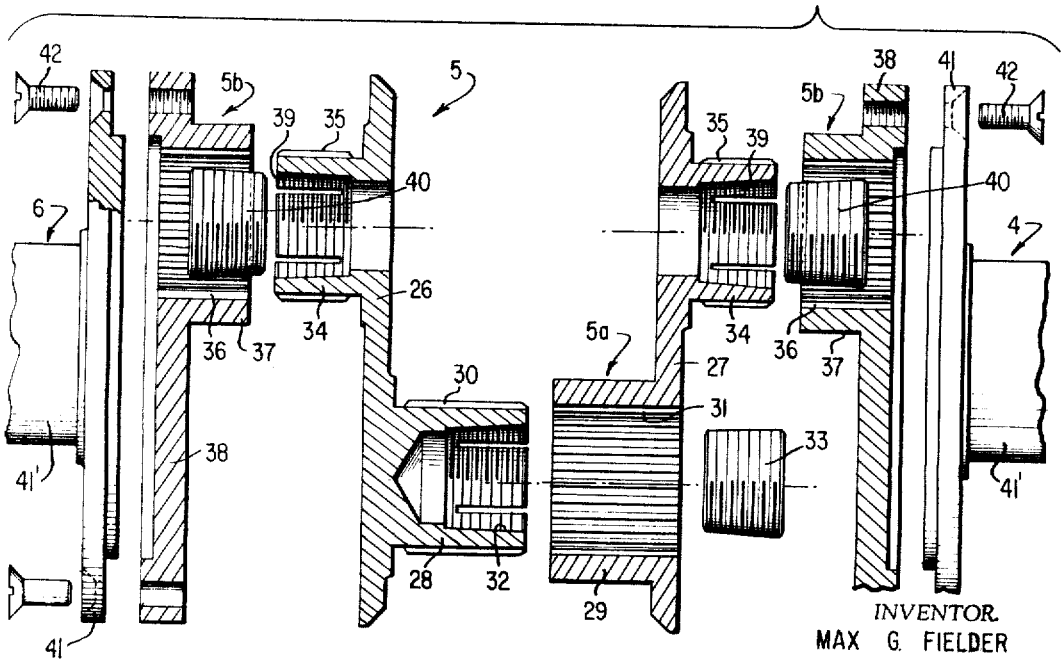
FIG. 5 is an exploded view, partially in section, showing the details of the engine crank shaft.

Since the crank ends 14f and 15e of the connecting rods 14 and 15, respectively, form the outer races for bearings 14h and 15g, it is necessary that smooth surfaces be provided for the outer races; hence, the crank ends of the connecting rods are solid; that is, not split in the conventional manner. Thus, to assemble the bearings and connecting rods on their respective crank pins it is necessary to provide a sectional crank shaft 5 as shown in FIG. 5, which comprises a first pair of discs 26, 27 provided with cylindrical members 28 and 29, extending from one face thereof, the member 28 being provided with external teeth 30 adapted to engage internal teeth 31 formed in the member 29, to thereby form a spline connection between the discs 26 and 27 when assembled. In order to maintain the discs in locked engagement the member 28 is provided with a tapered, slotted, threaded bore 32 adapted to accommodate a threaded plug 33 which forces the teeth 30 of the member 28 outwardly into locking engagement with the internal teeth 31 on the member 29. The opposite faces of the discs 26 and 27 are also provided with cylindrical members 34 extending outwardly therefrom, said members being provided with external teeth 35 adapted to engage internal teeth 36 formed in cylindrical member 37 extending outwardly from a second pair of discs 38. The cylindrical members 34 are also provided with a threaded, tapered, slotted bore 39 adapted to accommodate a threaded plug 40 for maintaining the teeth 35 and 36 in locked engagement. It will thus be seen that when the crank shaft is assembled, cylindrical members 28 and 29 form the central crank pin 5a and cylindrical members 34 and 37 form the outer crank pins 5b. A third pair of disks 41 are secured to the disks 38 by bolts 42 or other suitable securing means, each disk having a shaft 41' centrally mounted thereon to couple the fuel pump drive section 4 and the generator drive section 6 to the crank shaft section 5.

While a crank shaft for a two cylinder engine has been shown and described, it will be appreciated that the disks can be duplicated to extend the crank shaft for engines having 4, 6 and 8 cylinders.

As noted hereinabove, the mass of connecting rods 14 is equal to the sum of the masses of connecting rods 15, this, together with the novel construction of the crank shaft, results in a balanced system lending itself to high rotative speeds; while at the same time eliminating bending forces on the crank shaft, since all forces oppose each other, thereby diminishing excessive loads on the main bearings of the engine, resulting in a substantially vibration-free engine even at high rotative speeds.

In order to supply a desired quantity of fuel to the fuel nozzle assembly 18, a pump assembly 43 (FIGS. 2 and 4) is operatively connected to the fuel pump drive section 4 of the engine drive shaft. The pump assembly comprises a housing 44 formed with an inlet port 45 having a fitting 46 through which fuel oil is supplied from a suitable source (not shown). The inlet port 45 extends transversely to and is in communication with a bore 47 formed in the housing, said bore being provided with a fitting 48 having a plurality of passages 49, the fitting being connected to a fuel line 50 for establishing communication between the fuel pump assembly 43 and the fuel nozzle assembly 18. A disk 51 having a port 52 is mounted within the bore between one end of the fitting 48 and the end of a sleeve 53 also positioned within the bore. A ball check valve 54 is seated on one face of the disk 51 closing the port 52 to prevent back flow of fuel into the sleeve 53, the opposite face of the disk having a spring 55 seated thereon for biasing a cylindrical plunger 56 outwardly from the sleeve 53 into contact with one end of a lever 57 pivotally mounted on the pump housing as at 58. The plunger 56 is slidably mounted within the sleeve 53 and forms a pump chamber 56a therewith.

The pump drive shaft 4 for actuating the pump plunger 56 comprises a sleeve 59 (FIG. 3) maintained in press fit engagement within the tubular shaft 41' by means of a tapered plug 60 and bolt 61 threaded therein. The sleeve 59 is provided with a needle bearing assembly 62 having a roller 63 mounted on the outer race thereof by means of a cage assembly 64 secured to a flange 65 of the sleeve 59 by means of a shear pin 66.

By this construction and arrangement, as the pump drive shaft 4 rotates, the roller 3 imparts an impact blow to the lever 57 and plunger 56 to thereby discharge a volume of fuel oil to the fuel nozzle assembly 18. The novel construction of the roller 63 on the shaft 43' allows the engine to operate at high rotative speeds without incurring any damage to the engine because any excessive stresses will result in the shear pin 66 breaking, thereby allowing the roller 63 to rotate freely around sleeve 59 by means of the needle bearing 62; thus, the shear pin 66 will be the only item necessary to be replaced.

In order to vary the amount that the lever 58 can be brought into the path of the roller 63, and the amount of fuel pumped to the fuel nozzle assembly 18, a cam member 67 is pivotally mounted in the pump housing and is adapted to engage the lever 57 as at 68. The cam member is provided with a handle 69 provided with a spring biased detent 70 at one end thereof adapted to selectively engage a plurality of openings 71 formed in a plate 72 secured to the pump housing 44. By this construction and arrangement, when the handle 69 is rotated in the direction of the arrow (FIG. 4) the cam member 67 moves the lever 57 in a counterclockwise direction away from the path of the roller 63 to thereby move pump plunger 56 inwardly whereby the volume of pump chamber 56a is decreased resulting in decreasing the amount of fuel supplied to the fuel nozzle assembly and when the handle 69 is moved in the opposite direction, the lever 57 is tilted toward the path of the roller 63 to increase the volume of pump chamber 56a.

While the details of one pump assembly has been shown and described, it will be appreciated by those skilled in the art that since the engine is of the type having horizontally opposed cylinders the pump assembly for the combustion chambers for the respective cylinders are actuated simultaneously by the roller 63 and lever 57, and are in all respects identical, thus, a detailed description of the other pump assembly is not deemed necessary.

Figure 4:
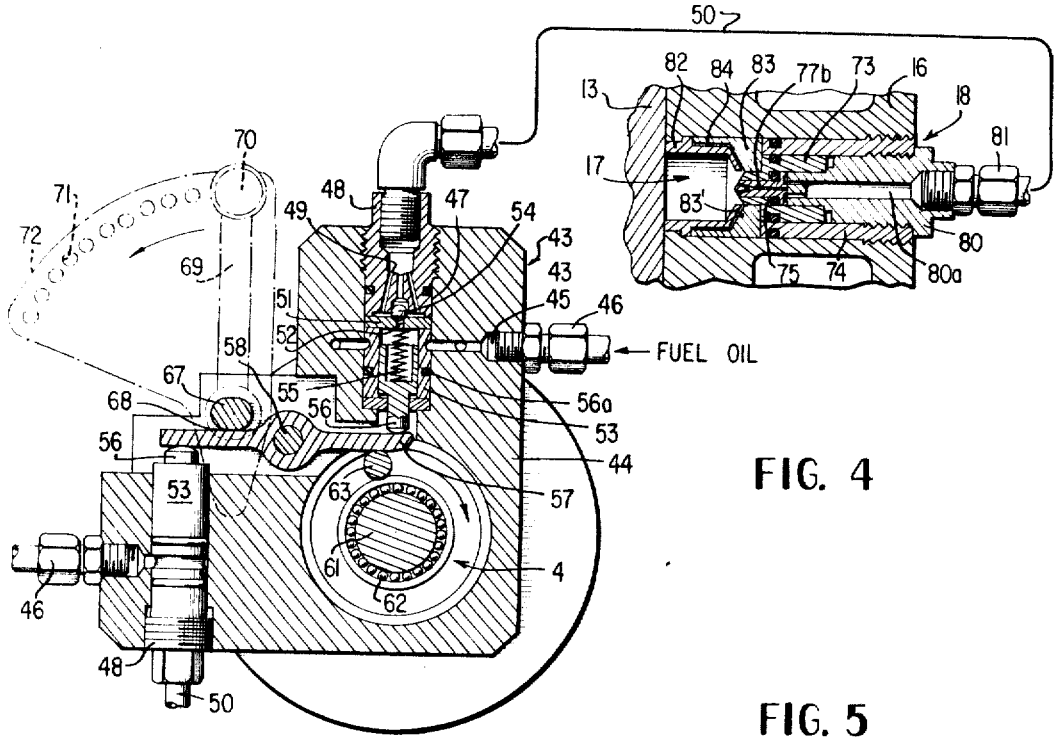
FIG. 4 is a sectional detailed view showing the engine fuel pump and injection nozzle assembly.
Figure 8:
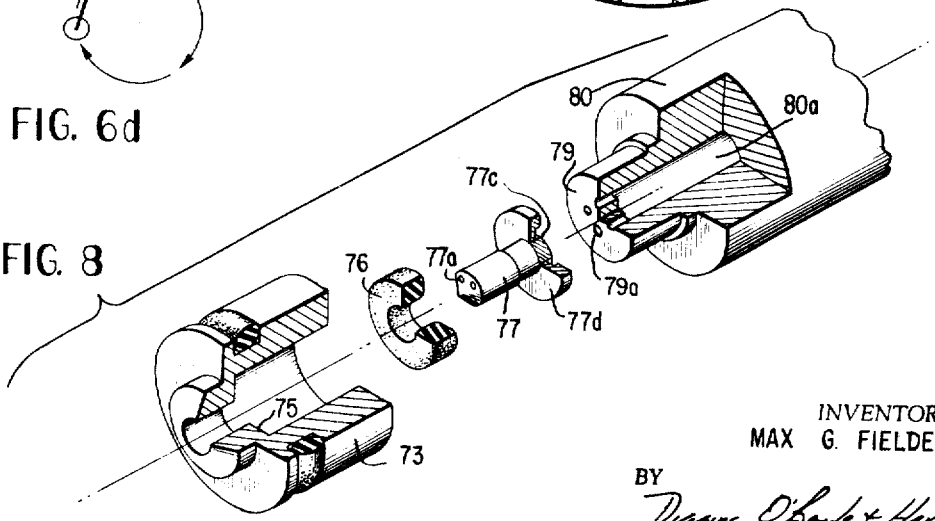
FIG. 8 is an exploded detailed view, partially in section, showing the fuel nozzle assembly.

The improved injection nozzle assembly 18 of the present invention, as shown in FIGS. 4 and 8, comprises a sleeve 73 rigidly mounted within a cylindrical sleeve 74 positioned within the cylinder head 16. The sleeve 73 is provided with a shoulder 75 at one end thereof upon which a high heat-resistant elastomeric ring 76 is seated. A valve member 77 is slidably mounted within the sleeve 73 and is biased by ring 76 against one end 79 of another sleeve member 80 rigidly mounted within the sleeve 74.

The valve member 77 is provided with a plurality of discharge orifices 77a which communicate with an axial passage 77b formed in the valve, said passage being coaxial with an annular chamber 77c formed by a flange member 77d carried by the valve. The end of sleeve 80 provides a flat seat for the valve 77 and has a plurality of ports 79a establishing communication between an axial passage 80a formed in the sleeve 80 and the annular chambers 77c, the opposite end of the sleeve 80 being provided with a fitting 81 for connecting the passage 80a with the fuel line 50.

The structural relationship between the fuel pump assembly 43 and the fuel nozzle assembly 18 is such that the fuel [is mixed with the air in the cylinder rapidly enough] *is injected into the air of combustion chamber and cylinder rapidly enough, yet in coarse enough form,* so that no combustion can be initiated during the admission period which should not exceed 7 to12 degrees crank angle, preferably 10 degrees. To accomplish this the pump plunger 56 is designed to have a constant effective stroke for a given setting of the cam member 67, and the fuel line 50 from the pump to the valve acts as a fuel reservoir, its residual pressure being determined by the biasing force of the elastomeric spring 76 on the injection valve 77. The roller 63 imparts an impact blow on the fuel column in fuel line 50 resulting in a pressure wave which, depending on its magnitude, forces the valve member 77 away from the seat 79 thereby compressing the elastomeric ring 76 to allow fuel to pass through the ports 79a into the axial passage 77b and out the discharge ports 77a into the combustion chamber 17. When pressure is relieved, the elastomeric ring 76 together with the rising pressure in the combustion chamber biases the valve member to close position against the valve seat 79. It will thus be seen that the magnitude of the impact blow determines the quantity of fuel discharged through the combustion chamber into the cylinder.

The discharge orifices of the valve 77 are constructed and arranged to cause the fuel to impinge on itself causing a foaming, rather than vaporizing, of the fuel because of the high velocity discharge through the small orifices, as disclosed in my aforementioned patent. By providing a valve which open [inwardly; that is,] *outwardly, that is, away from the nozzle body and* toward the combustion chamber 17 the lowest possible injection pressures 400–600 p.s.i.g. are feasible thus avoiding atomization or vaporization of the fuel and no lapping of the valve parts is necessary as is required in nozzle valves which open [outwardly, that is,] *inwardly, that is, into the nozzle body and* away from the combustion chamber; and by providing the valve with a flat seat rather than a tapered seat, dirt is not likely to accumulate since the seat has a self-cleaning tendency because of the direction in which the valve 77 slides.

To enhance the combustion efficiency of the engine the combustion chamber 17 is comprised of a thin-walled sleeve 82 of a high temperature, heat resistant steel positioned within a cylinder head 16, said sleeve being surrounded by an aluminum sleeve 83 having a coating of chromium plating on the inside surface 83' thereof. The aluminum sleeve 83 is spaced from the thin-walled sleeve 82 to form a clearance 84 whereby heat loss [can only be affected by radiation] *is limited mainly to radiation.* By this construction and arrangement the walls of the combustion chamber follow the temperature change of the compressed air during the engine cycle [without accumulating any] *with minimum accumulation of* heat from one cycle to another, thus preventing any unproportionate high residual wall temperature.

The performance of two-stroke compression ignition engines depends upon the effectiveness with which the exhaust products are driven from the cylinder and replaced by a charge of clear air and at what time in the cycle the exhaust ports and air inlet ports are opened and closed. After considerable research and experimentation it has been found that the exhaust products are most effectively driven from the cylinder by providing exhaust ports 85 FIGS. 6a to 7 in the cylinder 11 and liner 12 above and in proximity to the air inlet ports 86 supplied with air from a conventional scavenging blower not shown. The exhaust ports have a large circumferential length 85a and a small height 85b thereby providing a large exhaust area at the greatest differential pressure with a minimum of stroke loss for the escape of the exhaust products from the cylinder 12 to the atmosphere through ducts 85c FIG. 2.

Figure 6A:
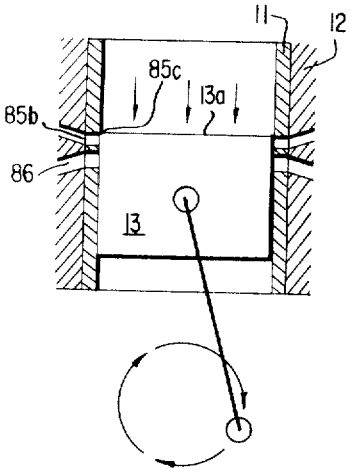
FIGS. 6a, 6b, 6c and 6d are schematic diagrams showing the engine scavenging cycle.
Figure 6B:
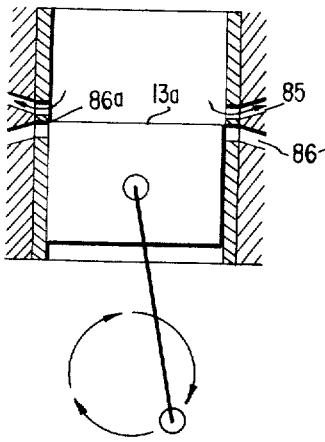
Figure 6C:
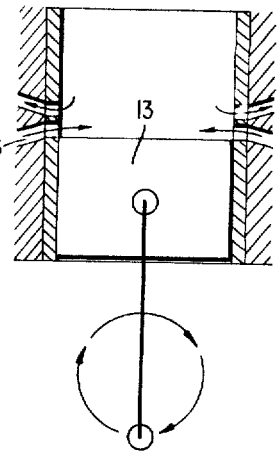
Figure 6D:
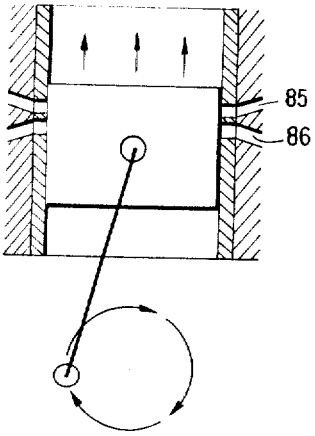
Figure 7:
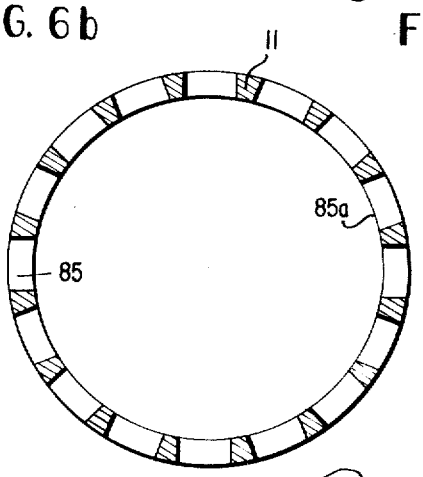
FIG. 7 is a top plan view of the engine cylinder showing the configuration of the exhaust ports.

As will be seen in FIGS. 6a through 6b, the exhaust and air inlet ports are constructed and arranged relative to the reciprocatory travel of the piston 13 such that when the piston is at a crank angle of approximately 65 degrees before bottom dead center, the upper edge 13a of the piston is located at the leading edge 85c of the exhaust ports FIG. 6a. When the piston reaches a crank angle of approximately 45 degrees before bottom dead center, the exhaust port 85 is completely open and the upper edge 13a of the piston is located at the leading edge 86a of the air inlet ports, and when the piston reaches dead center FIG. 6c, the exhaust and air inlet ports are completely open whereby air is symmetrically forced into the cylinder in one direction through the air inlet ports 86 and the products of combustion flow in the opposite direction through the exhaust ports 85. When the piston reaches a crank angle position of approximately 65 degrees after bottom dead center FIG. 6d the exhaust and air inlet ports are closed and the compression stroke of the engine begins.

In the operation of the engine, assuming that the air inlet and exhaust ports are closed by the piston, as the engine starts its compression stroke; namely when the pistons 13, 13' reach a crank angle of approximately 65 degrees after bottom dead center, a coarse spray of fuel is injected through the combustion chamber 17 and into the cylinders for a duration of approximately 10 degrees travel of the crank to form fuel droplets suspended in air in the cylinders. The air [suspended fuel droplets are compressed by the pistons,] *containing the fuel droplets is rapidly compressed by the piston* substantially isothermally, that is, approaching isothermal conditions depending upon the latent heat of evaporation of the fuel used and the size of the fuel droplets, until at the end of the compression stroke; namely, when the pistons are approximately .035" from [top dead center] *their top dead center position* or 98% of the effective stroke the total volume of the air [suspended fuel droplets are] *with its suspended fuel droplets is* rapidly compressed into the combustion chamber at a rate greater than the combustion reaction rate *to raise the temperature of the air containing the fuel droplets to a temperature above that at which ignition and combustion can take place before ignition and combustion can take place.* As the pistons move over top dead center, the volume of the air [suspended fuel droplets] *with its suspended fuel* starts to increase and the pressure and temperature are lowered into the range where ignition and combustion occurs. As the pistons descend the exhaust ports and air inlet ports are opened, as described hereinabove, and the cycle is repeated. It will thus be seen that since the [combustion reaction depends solely on pressure and temperature,] *commencement of combustion depends solely on the lowering of pressure and temperature into a range where ignition and combustion can occur, that is, the lowering of pressure automatically reduces the temperature of the air containing the fuel droplets from a temperature above that at which ignition and combustion can occur to a temperature at which ignition and combustion can take place and* the cycle is automatically self-adjusting insofar as the rotative speed of the engine is concerned.

*In summary; the engine and its advantages are as follows:*

*The present invention is for a solid fuel injection piston type compression engine and a method of operating such engine, which engine has a compression ratio by movement of the piston in the cylinder on its compression stroke sufficient to compress the air and fuel in the combustion chamber rapidly to a temperature above the temperature at which ignition and combustion can take place, and in which air is first supplied to the combustion chamber, and then fuel is supplied to the combustion chamber in relatively coarse droplet form to lengthen or increase the ignition delay lag which lengthens or increases the time of the combustion reaction rate, and then compressing the air and fuel in the combustion chamber by movement of the piston on its compression stroke with compression ratio so high as to raise the temperature of the air and fuel above the point at which ignition and combustion will occur, with the increase in temperature occurring rapid enough to take place before the end of the combustion reaction rate of the fuel in such droplet form so that ignition and ignition and combustion will not occur during such temperature rise and then moving the piston on its expansion stroke in the cylinder to thereby increase the volume of the combustion chamber and thereby reduce the pressure and temperature of the air and fuel in the combustion chamber to the temperature at which ignition and combustion will take place.*

*This engine and method have important advantages over conventional engines as follows:*

*It does not require a timing device as ignition and combustion take place at the right time automatically as the cycle of operation of the engine is independent of injection timing.*

*Another feature is that high pressures are not required in fuel injection because the fuel is injected in relatively coarse droplet form and atomization of fuel is not required, thereby allowing the use of relatively simple and inexpensive fuel injection equipment can be employed.*

*Furthermore, the engine will have a soft, smooth combustion characteristic which reduces the metallurgical and other requirements and is easy on such elements as piston rings.*

There has been described and illustrated a device capable of performing all of the specifically mentioned objects of this invention as well as others which are apparent to those skilled in the art. Various uses of the present invention may be made employing the described structure. Accordingly, it is apparent that variations as to operations, size and shape, and rearrangement of elements may be made without departing from the spirit of the invention. Accordingly, limitation is sought only in accordance with the scope of the following claims:

I claim:

1. A combustion chamber for a compression-ignition engine, comprising a thin-walled high temperature, heat resistant steel sleeve and an aluminum sleeve having a coating of chromium plating on the inside surface thereof, said aluminum sleeve surrounding the steel sleeve and spaced therefrom to form a clearance thereby affecting heat loss only by radiation, whereby the [walls of the combustion chamber follow the temperature change of the compressed air during the engine cycle without accumulating any heat from one cycle to another, thus preventing any unproportionate high residual wall temperature] *the temperature of the walls of the combustion chamber tends to follow changes in the temperature of the compressed air during the engine cycle with minimum accumulation of heat from one cycle to another, thus avoiding high residual wall temperature.*

2. A method of operating a solid fuel injection piston-type compression ignition engine characterized by a cycle of events in which fuel injection occurs during compression but ignition is delayed until the expansion stroke to thereby obtain an accelerated rate of combustion capable of operating the engine at speeds up to and in excess of 8000 r.p.m., said engine having a compression ratio in the order of 34 to 1 and including a combustion chamber, comprising the steps of supplying air to the engine cylinder when the piston is at bottom dead center, rapidly injecting a coarse spray of fuel through the combustion chamber into the cylinder in the form of droplets during the compression stroke as the piston reaches maximum speed, rapidly compressing the air and suspended fuel droplets into the combustion chamber during the terminal portion of the compression stroke at a rate to produce a temperature rise greater than the combustion reaction rate and to a temperature beyond the [combustion temperature of the fuel when in droplet form], *temperature at which the fuel can ignite,* moving the piston beyond top dead center to thereby increase the volume of the combustion chamber and reduce the temperature of the air surrounding the suspended fuel droplets to thereby lower the temperature and pressure of the air and suspended fuel droplets into the range where ignition will occur.

*3. A method of operating a solid fuel injection piston type compression ignition engine having a compression ratio sufficient to compress the air and fuel in the combustion chamber rapidly to a temperature above the temperature at which combustion can take place comprising, supplying air to said combustion chamber, supplying fuel in relatively coarse droplet form to said combustion chamber, compressing said air and fuel in said combustion chamber by movement of the piston on its compression stroke in the cylinder with compression ratio so high as to raise the temperature of the air and fuel above the point at which ignition and combustion will occur, with such increase in temperature rapid enough to take place before the end of the combustion reaction period of the said fuel in its droplet form so that ignition will not occur during such temperature rise, and then moving said piston on its expansion stroke in said cylinder to increase the volume of the combustion chamber and thereby reduce the temperature of the air and fuel in said combustion chamber to the temperature at which ignition will occur and combustion will take place.*

*4. A solid fuel injection piston type compression ignition engine having a compression ratio sufficient to compress the air and fuel in the combustion chamber rapidly to a temperature above the temperature at which combustion can take place, said engine having a cylinder and a piston in said cylinder and a combustion chamber, means for supplying air to said combustion chamber, means for supplying fuel in relatively coarse droplet form to said combustion chamber, means for moving said piston to compress said air and fuel in said combustion chamber on its compression stroke in the cylinder with the compression ratio of said cylinder and piston being so high as to raise the temperature of the air and fuel in said combustion chamber above the point at which ignition and combustion will occur with such increase in temperature rapid enough to take place before the end of the combustion reaction period of the fuel in its droplet form so that ignition will not occur during such temperature rise, and means for moving said piston on its expansion stroke in said cylinder to increase the volume of said combustion chamber and thereby reduce the temperature of the air and fuel in said combustion chamber to the temperature at which ignition will occur and combustion will take place.*

*5. A method of operating a solid fuel injection piston type compression ignition engine characterized by a cycle of events in which fuel injection occurs during the compression stroke but ignition is delayed until the expansion stroke, said engine having a compression ratio sufficient to compress the air and fuel in the combustion chamber rapidly to a temperature above the temperature at which combustion can take place comprising, supplying fuel in relatively coarse droplet form to said combustion chamber, compressing said air and fuel in said combustion chamber by movement of the piston on its compression stroke in the cylinder with compression ratio so high as to raise the temperature of the air and fuel above the point at which ignition and combustion will occur, with such increase in temperature rapid enough to take place before the end of the combustion reaction period of the said fuel in its droplet form so that ignition will not occur during such temperature rise, and then moving said piston on its expansion stroke in said cylinder to increase the volume of the combustion chamber and thereby reduce the temperature at which ignition will occur and combustion will take place.*

*6. A solid fuel injection piston type compression engine having a compression ratio sufficient to compress the air and fuel in the combustion chamber to a temperature above the temperature at which combustion can take place before the end of the ignition delay period of the fuel, said engine having a cylinder and a piston in said cylinder and a combustion chamber, the volume of said combustion chamber being controlled by the movement of said piston in said cylinder, means for effecting reciprocation of said piston in said cylinder, means for supplying air to said combustion chamber, means for supplying fuel to said combustion chamber in relatively coarse form during the compression stroke of said piston with the compression ratio of said cylinder and piston being so high as to raise the temperature of the air and fuel in said combustion chamber above the temperature at which ignition and combustion will occur with such increase in temperature rapid enough to take place before the end of the combustion reaction period of the fuel in its coarse form so that temperature will not occur during such temperature rise, means for increasing the volume of said combustion chamber whereby the temperature of said air and fuel in the combustion chamber will be reduced to the temperature at which ignition will occur and combustion take place.*

References Cited

The following references, cited by the Examiner, are of record in the patented file of this patent or the original patent.

UNITED STATES PATENTS

| | | | |
|---|---|---|---|
| 2,202,761 | 5/1940 | Fielder | 123—32 |
| 2,250,364 | 7/1941 | Fielder | 123—32 |

MARK NEWMAN, *Primary Examiner.*

LAURENCE M. GOODRIDGE, *Examiner.*

UNITED STATES PATENT OFFICE

CERTIFICATE OF CORRECTION

Reissue No. 26,222 June 20, 1967

Max G. Fiedler

It is certified that error appears in the above identified patent and that said Letters Patent are hereby corrected as shown below:

In the sheets of drawings line 1, "M. G. FIELDER", each occurrence, should read -- M. G. FIEDLER --; lower right-hand corner "MAX G. FIELDER", each occurrence, should read -- MAX G. FIEDLER --. In the heading to the printed specification, line 3, "Fielder" should read -- Fiedler --. Column 10, lines 55 and 56, "Fielder", each occurrence, should read -- Fiedler --.

Signed and sealed this 3rd day of March 1970.

(SEAL)
Attest:

Edward M. Fletcher, Jr.
Attesting Officer

WILLIAM E. SCHUYLER, JR.
Commissioner of Patents